United States Patent [19]
Schots

[11] 3,937,246
[45] Feb. 10, 1976

[54] VALVE MECHANISM
[75] Inventor: Klass Schots, Tilburg, Netherlands
[73] Assignee: Hopfma Anstalt, Schaan, Liechtenstein
[22] Filed: Mar. 26, 1974
[21] Appl. No.: 454,821

[52] U.S. Cl. .............................................. 137/322
[51] Int. Cl.² .................... F16K 43/00; F16K 51/00
[58] Field of Search ........... 137/315, 320, 321, 322, 137/329.1, 329.4; 222/400.7

[56] References Cited
UNITED STATES PATENTS

| 2,283,970 | 5/1942 | Buttner | 137/322 |
| 3,473,556 | 10/1969 | Johnson et al. | 137/322 |
| 3,776,260 | 12/1973 | Ruddick | 137/321 |

FOREIGN PATENTS OR APPLICATIONS

| 1,239,907 | 7/1971 | United Kingdom | 137/212 |

Primary Examiner—Henry T. Klinksiek
Attorney, Agent, or Firm—Pravel & Wilson

[57] ABSTRACT

A valve mechanism for draining liquid from a container with a pressurized gas. A pipe extends into the container to permit flow of liquid to an outlet. A nut mounts other components of the valve mechanism into the container when the nut is secured in the container opening.

A socket releasably connects the pipe and nut whenever the nut is not secured to the container. This allows the pipe, socket and nut to be manufactured separately and also permits replacement of a worn component without having to replace the entire valve mechanism.

12 Claims, 2 Drawing Figures

VALVE MECHANISM

This invention relates to valves for controlling the transfer of liquids from containers and, more particularly to such valve means incorporating a connection to a source of gas under pressure and manually operable valve actuating means.

A primary object of the invention is to provide valve means of a new or improved form and having a small number of moving parts for use in the filling, control, dispensing and transfer of liquids to and from a container such as for example beer containers.

Another object of the invention is to provide such valve means having the minimum number of packing and sealing means requiring substantially no maintenance and which can be easily and quickly removed and replaced in containers without affecting performance and operation of the valve.

A further object of the invention is to provide such valve means having a simple structure, robust construction, and capable of being manufactured and maintained at low cost.

The container may be of any convenient shape, size or form and may be fabricated, formed or manufactured from any suitable materials or combination of materials. Materials which are chemically inert may be used to line a container of another material. Gas under pressure is fed to the container via the valve means to force liquid to flow therefrom via the valve means, and suitable ducting to a tap or other form of outlet control.

The present invention overcomes the disadvantages of known valve mechanisms used for the transfer of beer or other beverages from containers and provides a simplified construction less sensitive to disturbance and less costly to maintain.

According to the invention a valve mechanism for drawing off liquid from a container with the aid of pressurized gas introduced into the container includes a connecting member fastened to the container and having fastened to it a a hollow rising pipe extending down to near the bottom of the container and being open at the lower end and closed at the top end, whilst near the top end the sidewall of the rising tube has apertures, a connecting piece coupled to the connecting member and provided with a gland with the aid of which a closing member may be urged from a closed position in which the closing member is located above the apertures of the rising pipe so as to bear on a shoulder at the top end of the rising pipe against the action of a spring mechanism, and into an open position, in which the closing member is located beneath said apertures so that an open communication is established with the interior of the rising pipe and the hollow gland with which a liquid drain member can be connected and a supply duct for the pressurized gas on the connecting piece, the closing member being formed by a ring of elastic material surrounding the rising pipe, said ring bearing, in the closed state, not only on the shoulder at the top end of the rising pipe by its circumferential rim farthest from the rising pipe but also on a shoulder forming part of a removable ring accommodated in the connecting member.

According to the invention the closing member is in the form of a ring of elastic material surrounding the rising pipe, and bearing, in the closed state, not only on the shoulder at the top end of the rising pipe but also by its periphery farthest remote from the rising pipe on a shoulder forming part of a removable ring arranged in the connecting member. This closing member has a very simple shape and can be cheaply manufactured and readily replaced by removing the ring in the ring in the event of damage or wear.

The invention will now be described by way of example with reference to the accompanying drawings in which.

Figure 1:
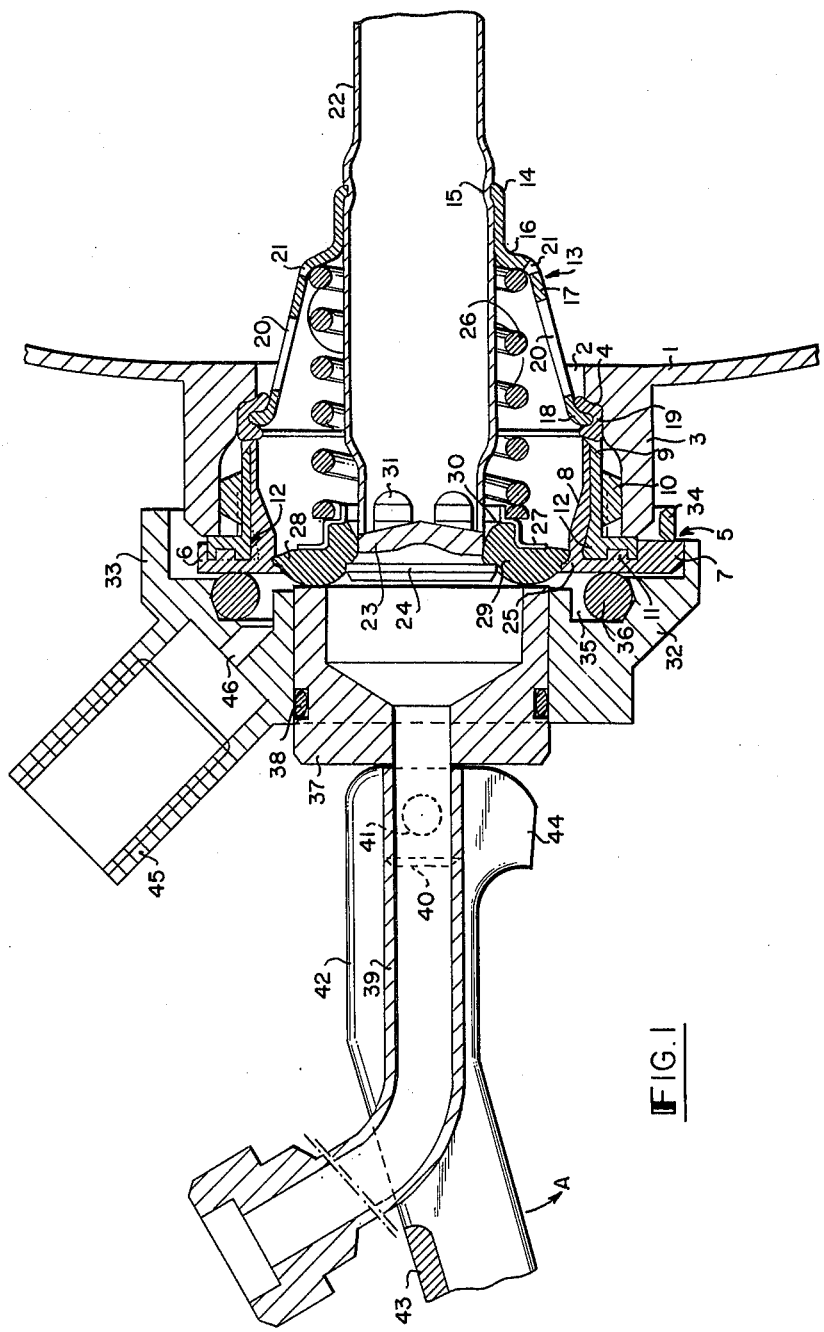
FIG. 1 is a sectional view of the valve mechanism in the closed state.

The FIGS. show part of a vessel 1 in which an opening 2 is surrounded by a collar 3, integral with the vessel 1 and extending upwards from the vessel wall and having an internal screwthread. A shoulder 4 is formed near the lower end of the sleeve 3.

The connecting member arranged in the vessel comprises a nut 5, screwed into the sleeve 3 and having an outer periphery with three flat sides 6 equally spaced apart around the periphery. The nut 5, which serves for securing in place the further parts of the connecting member in the vessel, comprises a metal portion formed by an upper ring 7 having flat sides with an apron 8 suspended therefrom, at the lower end of which a rim 9 is inclined upwardly and outwardly, and an externally screwthreaded sleeve 10 of synthetic resin, which is screwed into the internally screwthreaded collar 3. The sleeve 10 extends along the outer circumference of the apron 8 and the lower side of the upper ring 7, the portion of the sleeve 10 extending along the lower side of the upper ring bearing on the top surface of the sleeve 3 in order to form a seal. With the aid of the upwardly extending rim 9 and of an annular projection 11, which is arranged on the lower side of the upper ring and is integral with said upper ring and which is located in the part of the sleeve 10 extending along the upper ring, the sleeve 10 is firmly anchored on the nut 5.

The metal portion 7, 8 of the nut 5 is non-circular at the corner 12 between the upper ring 7 and the apron 8, so that rotation of the sleeve 10 around the apron 8 is prevented.

The above construction of a nut comprising a metal supporting body 7, 8 and a screwthreaded portion of a synthetic resin is particularly suitable for use on aluminium vessels, since aluminium does not permit of making a satisfactory seal, whilst nuts completely made of a synthetic resin tend to become brittle and break down. With the construction described above the risk of breakage of the plastic portion is practically nil, since this portion is only subjected to pressure, whilst a satisfactory enclosure and protection of the plastic portion is provided by the apron 8. At the area of the apron the temperature may rise to a considerable extent, which would be detrimental to the lifetime of the plastic sleeve 10, if it were directly exposed to said high temperature.

With the aid of the nut 5 a socket 13 forming part of a connecting member is clamped tight in the vessel. The socket 13 has a cylindrical portion 14, the lower edge 15 of which is bent over inwardly, an intermediate portion 16 which is outwardly flanged and a conical portion 17. The conical portion 17 is provided at its upper end with an outwardly directed, tapering rim 18. The tapering rim or nose 18 is located in a recess of a packing ring 19 of elastic material one limb of which is located beneath the nose 18 and on the shoulder 4, whilst a substantially triangle-section limb is enclosed between the nose 18 and the rim 9 of the nut 5. It will be obvious that when tightening the nut 5 the part of the packing ring 19 located above the nose 18 is compressed between the upwardly inclined rim 9 and the top surface of the rim 18 inclined downwardly from the interior to the exterior so that the packing is, in addition, urged against the interior of the sleeve 3. The lower part of the packing is compressed between the lower surface of the nose 18 and the top surface of the shoulder 4.

A satisfactory seal is thus obtained between the various parts so that leakage along the shoulder 4, the rim or nose 18 and the rim 9 is excluded.

From the FIG. it will be apparent that the conical portion 17 has a plurality of large holes 20, and the corner part between the flange 16 and the conical portion 17 has a plurality of smaller holes 21.

The bent-over lower rim 15 of the socket 13 is accommodated in a groove provided in a vertical rising pipe 22 so that in an axial direction the rising pipe is immovably connected with the socket 13. The top end of the rising pipe 22 is closed by a plug 23 having a projecting rim 24 forming a shoulder. The rising pipe 22 with the plug 23 is arranged so that the shoulder 24 is located approximately at the same level as a shoulder formed by an inwardly projecting rim 25 on the top side of the upper ring 7 of the nut 5.

The portion of the rising pipe 22 projecting above the flange 16 is surrounded by a compression spring 26, which is enclosed between the flange 16 and a cup spring 27. The cup spring 27 comprises an upper ring located in a plane at right angles to the centre line of the rising pipe and terminating by its inner wall in a sleeve-like part concentric with the rising pipe, the lower end of said part being in contact with the ring extending parallel to the upper ring. The inner wall of the latter ring is in contact with a sleeve extending downwards away from said ring concentrically to the rising pipe. The cup spring of this construction serves for holding a closing member 28 of elastic material, for example, rubber or synthetic resin. From FIG. 1 it will be apparent that the upper surface of the annular closing member joins the lower side of the shoulder 24 by its inner circumference and the shoulder 25 by its outer circumference, between which shoulders a portion projects above the contact surfaces, the top surface of said part being more or less spherical. The closing member 28 furthermore comprises a downwardly extending rim 30, which engages the inner circumference of the sleeve extending from the top ring of the cup spring in a downward direction, whereas the inner circumference of the closing member has a tapering shape so that in the position shown in FIG. 1 only the part of the inner wall of the closing member located near the shoulder 24 engages the plug 23 and the rising pipe 22 respectively.

Beneath the plug the top end of the rising pipe has an additional number of appertures 31.

The connecting piece comprises a housing 32 having a depending uninterrupted rim 33. Three equally spaced parts 34 of the circumference of the rim 33 are depressed inwardly so that, when the parts 34 are opposite the flat sides 6 of the nut 5, the rim 33 can be slipped onto the nut 5 so that the upper edges of the depressed parts 34 arrive beneath the lower surface of the upper ring 7 of the nut 5. When subsequently the housing is turned through a given angle the depressed parts will arrive at the side of the flat sides 6 beneath the upper ring 7 of the nut 5 so that the housing 32 is coupled with the nut 5 by a kind of bayonet joint. In order to ensure a satisfactory seal between the housing 32 and the upper surface of the nut 5, a packing ring 36 is arranged in an annular groove 35 in the housing.

A central opening in the housing 32 slidably accommodates a hollow gland 37, a groove provided in the outer periphery of the hollow gland 37 accommodating a packing ring 38 for obtaining a seal between the gland and the inner wall of the central recess in the housing 32. The gland 37 is integral with an outlet 39, with which a duct or the like can be connected.

On either side of the gland the housing has secured to it supports 40, extending upwardly from the top surface of the housing 32, with which supports are pivotally connected the limbs 42 of a handle 43 located on either side of the outlet by means of horizontal stubs 41. At the lower ends of the limbs 42 projecting noses 44 are provided.

The housing 32 is furthermore provided with a connecting piece 45, with which a source of pressurized gas, for example, a $CO_2$ containing cylinder can be connected. The interior of the piece 45 communicates through a channel 46 in the housing 32 with the free portion of the groove 35 enclosed by the packing ring 36, which portion (see the Figure is in open communication with the space accommodating the closing member 28. It should be noted that the outer diameter of the gland 37 is smaller than the inner diameter of the rim of the nut 5 forming the shoulder 25.

It will be obvious that the passage for the pressurized gas through the channel 46 to the interior of the vessel is blocked by the closing member, whilst the closing member 28 furthermore prevents leakage of the liquid out of the vessel.

Figure 2:
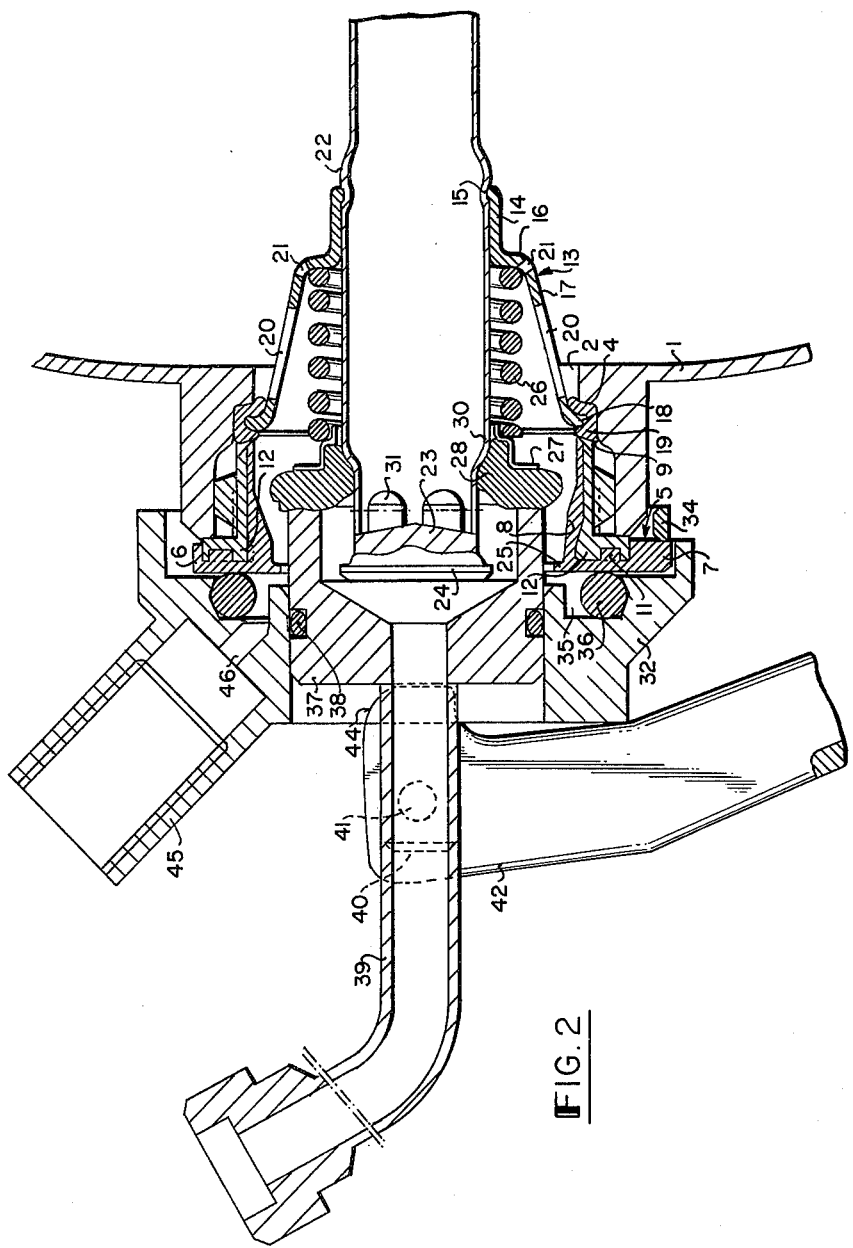
FIG. 2 is a sectional view of the valve mechanism in the open state.

For opening the valve mechanism the handle 43 can be turned in the direction of the arrow A out of the position shown in FIG. 1 to the position shown in FIG. 2. The noses 44 will urge the gland 37 out of the position shown in FIG. 1 in downward direction into the position shown in FIG. 2. The closing member 28 is thus urged downwards against the action of the spring 26. The lower side of the suspending rim of the closing member then comes into contact with the spherical surface 29 of the closing member and urges this surface downwards so that the closing member is deformed. Since, as is shown in the figures, the outer diameter of the plug 23 closing the top end of the rising pipe and of the adjacent portion of the rising pipe provided with the apertures 31 is smaller than the outer diameter of the subjacent portion of the rising pipe, the two portions of different diameters being joined to one another by a tapering portion, the closing member will be deformed so that the inner circumference of the closing member will join the tapering portion of the rising pipe and the adjacent cylindrical portions of the rising pipe beneath the apertures 31. Since the closing member is furthermore urged away from the shoulder 25 a free passage is obtained around the gland 37 and inside the rim 25 so that pressurized gas can flow via the channel 46 along the outer circumference of the gland 37 into the space formed by the apron 8 and the tapering portion 17 of the socket 13 and thence through the apertures 20 and 21 into the interior of the vessel. The liquid contained in the vessel, for example beer, is subjected to pressure so that it is pressed upwards through the rising pipe. The liquid can thus flow into the interior of the hollow gland and the outlet 39, which is integral therewith. It will be obvious that the liquid can only escape through the outlet 39, since the closing member blocks any other passage because it engages the outer circumference of the rising pipe 5 beneath the aparatures 31 and on the lower rim of the gland 37.

Generally, the duct connected with the outlet 39 will include a cook for regulating the outflow of liquid from the vessel.

It will be apparent that the valve mechanism described above has a simple structure, can be manufactured from readily obtainable parts and can be readily mounted and dismounted, which is of importance for example when replacing the closing member 28, or the packing rings 19, 36 and 38 in the event of wear or damage.

What we claim is:

1. A valve mechanism, for mounting in an opening of a container, for draining liquid from the container with the aid of a pressurized gas, said valve mechanism operating in conjunction with a connecting piece having a movable gland provided with a bore, an inlet means for inlet of pressurized gas to the container, and an outlet means for outlet of the liquid from the container, said valve mechanism comprising:
   a. pipe means extending into the container, being open at the lower end thereof and closed at the top end, for conveying liquid from the container, said pipe means having apertures formed in the upper portion thereof for the flow of liquid from the interior of said pipe means to the outlet means, and further having a connecting groove formed therein;
   b. a connecting member for insertion into the opening of the container to permit said pipe means to be mounted into the container, said connecting member being movable between a secured position with respect to the container and a released position with respect to the container;
   c. socket means for releasably connecting said pipe means to said connecting member, said socket means having a lower position mounted with said connecting groove of said pipe means to releasably connect said pipe means to said connecting member when said connecting member is in the said secured position, said socket means also having openings therein for permitting the flow of gas into the container;
   d. closing means movable in response to the movement of the movable gland in the connecting piece between a closed position blocking entry of the gas into the container and flow of liquid from the container through said apertures in said pipe means, and an open position permitting entry of gas into the container and flow of liquid from the container through said apertures in said pipe means; and
   e. said closing means in said open position establishing communication between the interior of said pipe means and the bore in the movable gland for the passage of liquid from the container, and further forming a separate passageway, having walls formed by said closing means, the movable gland, and said connecting member for entry of gas through said openings formed in said socket means into the container.

2. The valve mechanism as set forth in claim 1 wherein a shoulder is formed at said top end of said pipe means and wherein:
said closing means, in said closed position, has an inner edge which bears on said shoulder at said top end of said pipe means, and an outer edge which bears on said connecting member, thereby forming a seal.

3. The valve mechanism as set forth in claim 2, wherein:
said pipe means includes a lower shoulder formed therein below said apertures in said pipe means for cooperating with said closing means when said closing means is in said open position, thereby sealing said liquid passageway from said gas passageway.

4. The valve mechanism as set forth in claim 2, wherein said closing means comprises:
   a. an annular closing member of elastic material surrounding said pipe means for forming a seal between said closing means and said pipe means and between said closing means and said connecting member, said closing member also having a surface for cooperating and sealing with the movable gland; and
   b. a cup spring for holding said closing member and for engaging said resilient means.

5. The valve mechanism as set forth in claim 2, wherein said pipe means comprises:
   a. a pipe extending into the container for conveying liquid from the container, said pipe having apertures formed in the upper portion thereof for the flow of liquid from the interior of said pipe to the outlet means; and
   b. a plug inserted into the top end of said pipe means for blocking the flow of liquid through the top end of said pipe, said plug having a projecting rim for cooperating with said inner edge of said closing means.

6. The valve mechanism as set forth in claim 2, further comprising:
resilient means for urging said closing means into said closed position in the absence of movement of the movable gland.

7. The valve mechanism as set forth in claim 2, wherein:
said resilient means comprises a spring mechanism.

8. The valve mechanism as set forth in claim 1, wherein said lower portion of said socket means comprises:
   a. a cylindrical portion for cooperating with the outer circumference of said pipe means; and
   b. a rim formed at the lower end of said cylindrical portion for mounting with said connecting groove in said pipe means.

9. The valve mechanism as set forth in claim 8, wherein said socket means further comprises:
   a. a packing ring having a recess therein for forming a seal between said valve mechanism and the container; and
   b. an upper portion provided with a rim for fitting into said recess of said packing ring for securing said socket means in the container whenever said connecting member is in said secured position.

10. The valve mechanism as set forth in claim 1, wherein:
said connecting member comprises a removable ring means.

11. The valve mechanism as set forth in claim 10, wherein:
said removable ring means comprises a nut.

12. The valve mechanism as set forth in claim 11, wherein said nut comprises:
   a. a screw-threaded sleeve of synthetic resin whch screws into the container for securing said valve mechanism to the container and which forms a seal between the container and said valve mechanism; and
   b. a metal supporting body for anchoring said screw-threaded sleeve to said nut.

\* \* \* \* \*